No. 781,198.

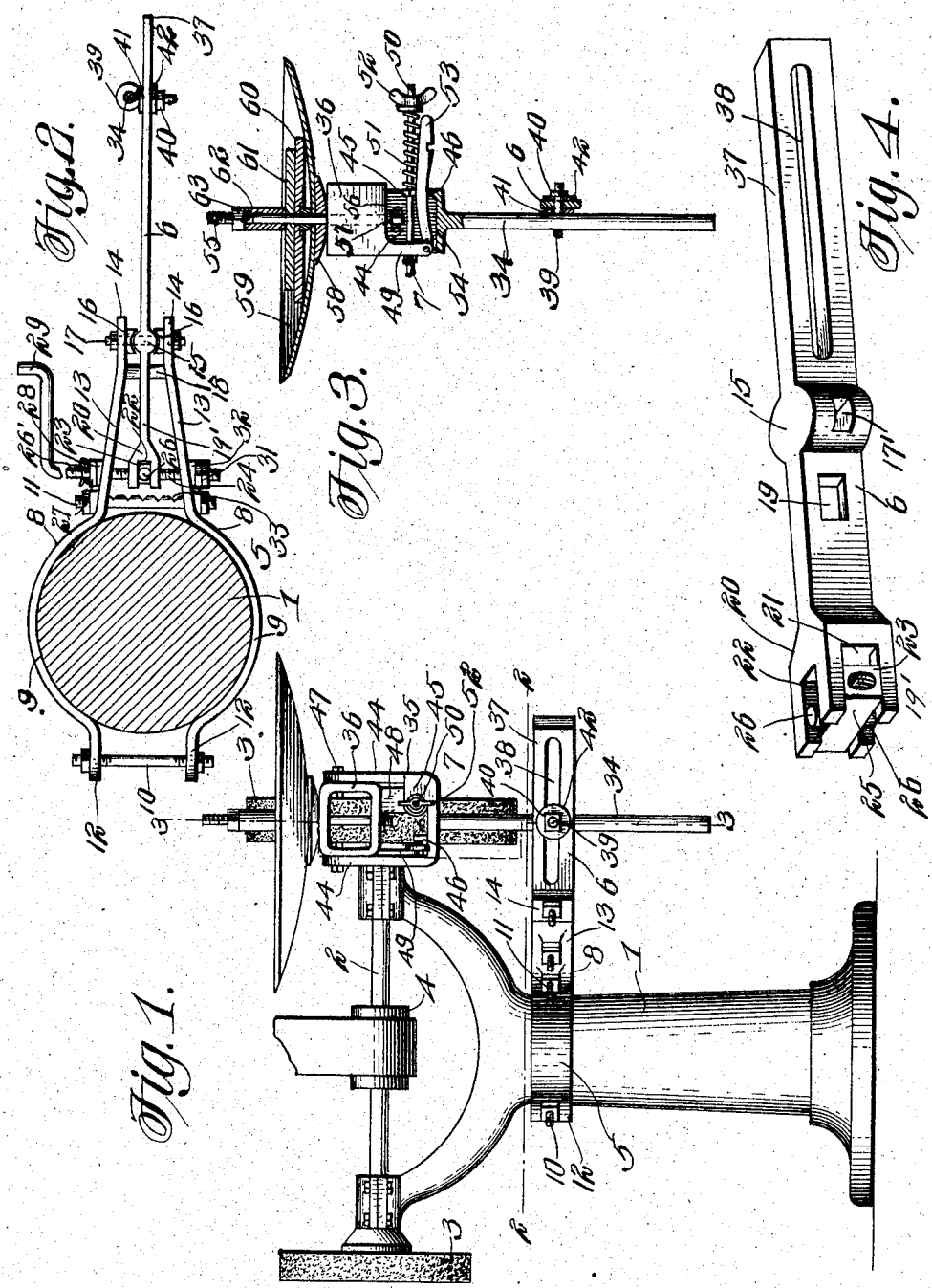

Patented January 31, 1905.

UNITED STATES PATENT OFFICE.

ROYAL M. HAMMOND, OF DOWNS, KANSAS.

DISK-SHARPENING MACHINE.

SPECIFICATION forming part of Letters Patent No. 781,198, dated January 31, 1905.

Application filed July 25, 1904. Serial No. 218,007.

*To all whom it may concern:*

Be it known that I, ROYAL M. HAMMOND, a citizen of the United States, residing at Downs, in the county of Osborne and State of Kansas, have invented certain new and useful Improvements in Disk-Sharpening Machines; and I do declare the following to be a full, clear, and exact description of the invention, such as will enable others skilled in the art to which it appertains to make and use the same.

My invention relates to improvements in disk-sharpening machines, and more particularly to the machine set forth in my application for patent filed May 5, 1904, Serial No. 206,544.

One object of the present invention is to provide simple and efficient means whereby the disk-holding device may be readily adjusted to change the bevel upon the disk-bevel sharpened.

A further object of this invention is to provide simple and efficient means for holding the disk-holding device away from the grindstone or emery so that a disk may be readily applied thereto and removed therefrom.

With the above and other objects in view the invention consists of certain novel features of construction, combination, and arrangement of parts, as will be more fully described, and particularly pointed out in the appended claims.

In the accompanying drawings, Figure 1 is a side elevation of a well-known form of grinding-machine with my improved disk-grinder applied thereto. Fig. 2 is a horizontal sectional view taken on the line 2 2 of Fig. 1. Fig. 3 is a vertical sectional view taken on the line 3 3 of Fig. 1. Fig. 4 is a perspective view of the adjusting-arm and the traveling nut in one end of said arm.

Referring to the drawings by numerals, 1 denotes the stand of the grinding-machine, upon the upper portion of which is journaled a shaft 2, having at each of its ends a grindstone or emery-wheel 3 and at its center a pulley or band-wheel 4, by means of which said shaft and grindstone may be rotated.

My improved disk-grinder comprises a clamping-bracket 5, an adjustable arm 6, mounted upon said bracket, and a disk holder or supporting device 7, mounted upon said arm. Said bracket 5, which is adjustably clamped upon the stand 1, comprises two similar members 8, formed with reversely-curved portions 9, adapted to engage opposite sides of said stand 1 and to be retained thereon by two bolts 10 and 11, disposed at the ends of said curved portions 9. Said bolt 10 passes through openings formed in the rearwardly-projecting parallel ends 12 of said members 8, and said bolt 11 passes through similar openings formed in the forwardly-projecting portions 13 of said members 8. The said forwardly-projecting portions 13 converge toward each other and terminate in end portions 14, which are disposed parallel with each other.

The arm 6 is pivotally mounted, so as to swing in a horizontal plane between said front end portions 14 of the clamping-bracket. This pivotal connection may be effected in any desired manner; but I preferably provide upon said arm 6 at a suitable point intermediate its end a vertically-disposed cylindrical portion or hub 15, which is adapted to engage concave bearing-blocks 16, provided upon the inner faces of said ends 14, as clearly shown in Fig. 2 of the drawings. Said cylindrical portion 15 is retained between said bearing-blocks by a bolt 17, which passes through alining openings formed in the ends 14, the blocks 16, and the cylindrical portion 15. As shown in Fig. 4, the openings 17' in said portion 15, through which said bolt 17 passes, is elongated in order to permit the arms 6 to swing in a horizontal plane. In order to prevent the ends 14 and bearing-blocks 16 from being clamped too tightly upon the cylindrical portion 15, I provide a spacing-block 18, which extends loosely through a slot 19, formed in the arm 6, and has its ends engaging the inner faces of said end portions 14 of the bracket. By providing said spacing-block 18 it will be seen that the arm 6 will always be permitted to be adjusted between the members 8 of the clamping-bracket.

Any suitable means may be provided for adjusting the arm 6 in a horizontal plane; but I prefer to form upon its inner end 19' a head 20, which is slotted or recessed in a horizontal plane, as shown at 21, and also in a vertical plane, as shown at 22, in order to receive a traveling nut 23, which is mounted on a screw 24, extending between the members 13 of the clamping-bracket 5. Said screw 24 passes through a screw-threaded opening in the body portion 25 of the nut 23, which body portion is mounted to slide freely in the horizontally-disposed recess 21 of the head 20. Upon the upper and lower faces of said body portion 25 are projecting pins or studs 26, which project into and slide in the vertically-disposed recesses 22 of said head 20. The screw 24 may be swiveled in the portions 13 of the bracket members 8 in any desired manner, so that it may rotate freely, but cannot move longitudinally. As shown, said screw 24 is in the form of a shaft and has adjacent to one of its ends a split key or other stop 26' and a washer 27, which is adapted to engage an enlargement 28, formed upon one of the members 13. The extreme outer portion of this end of the screw 24 is provided with a crank-handle 29 or any other suitable operating device, and the opposite end of said screw is provided with two clamping-nuts 31, the innermost one of which bears against an enlargement 32, formed upon one of the members 13 of the clamping-bracket. It will be seen that when the screw 24 is rotated the nut 23 will be moved in either direction upon the same, and the arm 6, owing to its loose or sliding connection with said nut, will be swung in either direction in a horizontal plane. In order to indicate the degree of adjustment of the arm 6, I provide a suitable scale, which is here shown in the form of a series of notches 33, provided upon the bolt 11 of the clamping-bracket 5. Any other suitable scale or indicating device may be substituted for that shown.

The disk holding or supporting device 7 comprises a holder-bar 34, having at one end a U-shaped supporting-bracket 35 and a disk-holder proper, 36, which is pivotally mounted in said portion 35. A holder-bar 34 is adjustably secured upon the outer end 37 of the arm 6, preferably by forming said arm with a longitudinally-disposed slot 38, through which an eyebolt 39 is passed and in which it is adjustably secured by a clamping-nut 40. The bar 34 passes through the eye of said bolt, upon which a clamping-ring 41 and a washer 42 are also provided in order to securely hold the bar upon the arm 6 at any desired adjustment, as will be readily understood. The U-shaped support 35, between the arms 44 of which the disk-holder 36 is pivoted, is formed adjacent to the lower portion of one of its arms with a lug 45 and upon the lower portion of its other arm with a recessed lug 46. The disk-holder 36, which is rectangular in form and pivoted at 47 between the arms 44, is formed upon its under side at opposite ends with depending lugs 48 and 49. The disk-holder may be turned angularly with respect to the holder-bar by means of an adjusting-bolt 50, which passes through openings in the lugs 48 and 45 and is provided with a tension-spring 51 and a wing-nut 52. By turning the said nut the disk-holder may be set at any desired inclination. The spring forms a yielding connection between the disk-holder and the holder-bar, which gives the disk-holder angular motion independent of the holder-bar to compensate for any imperfection in the shape of the disk which is being ground, so that a disk which is not true in shape will nevertheless have all the parts of its edge ground alike.

In order to swing the disk-holder 36 so that the disk which it supports, as hereinafter described, will be held away from the grindstone 3, I pivot upon said lug 49 a keeper or lever 53, which is formed upon its under side adjacent to its outer end with a notch 54, which is adapted to coact with the recessed lug 46 upon the support 35. It will be seen that said lever slides in the recess of said lug 46 and that when the lever is moved inwardly to swing the disk-holder outwardly the notch 54 in said lever will engage the recess in said lug 46 and lock or hold the disk-holder in said position.

Any suitable means may be provided for securing the disk to be ground upon the disk-holder 36. As shown, I have provided a clamping-bolt 55, which has its lower portion passed through openings in the upper and lower sides of the disk-holder and secured thereto by a key 56 and a washer 57, the latter bearing against the under side of the disk-holder. The said clamping-bolt is provided with a disk-seat 58, which is concavo-convex, with its concave side uppermost. The disk 58 which is to be sharpened is placed upon the seat 58, and a muffler 60 is placed upon the upper concave side of said disk. Upon the upper side of the muffler is a washer 61, and upon the bolt 55 above said washer is a sleeve 62. Upon the outer end of the bolt is a nut 25, which coacts with the disk-seat, the washer, the tubular sleeve, and the muffler to firmly clamp the disk in place. The clamping-bolt is revoluble in the disk-holder, so that the disk is revolved by the action of the emery-wheel or grindstone employed to grind and bevel the edge of the disk.

From the foregoing description, taken in connection with the accompanying drawings, it is thought that the construction, operation, and advantages of my invention will be readily understood. It will be seen that by adjusting the nut 52 the tension of the spring may be varied so that the disk 59 will be held against the emery-wheel or grindstone with any desired force. Should it be desired to change the bevel of the cutting edge of the disk, the crank-handle 29 is turned in order to swing the arm 6 horizontally, and thus move the disk angularly in a horizontal plane, as will be readily understood. When it is desired to apply or remove a disk to or from the disk-holder 36, the latter is swung or tilted outwardly and secured in that position by means of a keeper or latch 53.

While I have shown the preferred embodiment of my invention, it will be understood that I do not limit myself to the precise construction herein set forth.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a disk-sharpening machine, the combination with a supporting-stand and a revoluble grinding element, of a clamping-bracket upon said stand, an arm upon said bracket, a disk-holder carried by said arm and means for adjusting said arm angularly in a horizontal plane upon said bracket, substantially as described.

2. In a disk-sharpening machine, the combination with a supporting-stand and a revoluble grinding element, of a clamping-bracket upon said stand, an arm pivotally mounted intermediate its ends upon said bracket, means for supporting a disk from the outer end of said arm and means for adjusting the inner end of said arm, substantially as described.

3. In a disk-sharpening machine, the combination with a supporting-stand and a revoluble grinding element, of a clamping-bracket upon said stand, an arm pivotally mounted intermediate its ends upon said bracket, means for adjusting the inner end of said arm and means for indicating the adjustment of said arm, substantially as described.

4. A disk-sharpener comprising a clamping-bracket adapted to be secured to a grinding-stand, a movable arm upon said bracket, a disk-holding device carried by said arm, and a screw for adjusting said removable arm, substantially as described.

5. A disk-sharpener comprising a clamping-bracket adapted to be secured to a grinding-stand, an arm pivotally mounted intermediate its ends upon said bracket, means carried by one end of said arm for holding a disk, and a screw for adjusting the other end of said arm, substantially as described.

6. A disk-sharpener comprising a clamping-bracket adapted to be secured to a grinding-stand, a swinging arm upon said bracket, means carried by said arm for holding the disk, a screw-shaft mounted in said bracket, a nut upon said screw-shaft having a loose connection with said arm, and means upon said screw-shaft for turning the same to adjust said arm substantially as described.

7. A disk-sharpener comprising a bracket consisting of two members and bolts for clamping said members upon a grinding-stand, an arm pivotally mounted intermediate its ends between said members of said bracket, means carried by the outer end of said arm for holding a disk, a swiveled screw in said members of said bracket, a traveling nut upon said screw having a sliding connection with the inner end of said arm, and means for turning said screw, substantially as described.

8. In a disk-sharpener, a bracket comprising two clamping members, an adjustable disk-carrying arm mounted between said members, means for clamping said members upon said arm, and means for limiting the clamping action of said members upon said arm, substantially as described.

9. In a disk-sharpener, a clamping-bracket comprising spaced members, an arm pivotally mounted between the said members, a screw to adjust the arm angularly and coacting with the pivotal connection between the bracket and the arm to support the latter, a bolt connecting the spaced members of the bracket and having a scale to indicate the adjustment of the arm, and a disk-holder carried by the said arm, substantially as described.

10. In a disk-sharpener, a supporting-arm, a holder-bar, means connecting the said bar to the said arm for adjustment of the former on the latter, a disk-holder pivotally mounted on the holder-bar, and means to adjust the pivotally-mounted disk-holder, substantially as described.

11. In a disk-sharpener, a supporting-arm, a holder-bar having a bifurcated end, means connecting the holder-bar to the said arm for adjustment of the former on the latter, a disk-holder pivotally mounted at the bifurcated end of the holder-bar, and means to adjust the pivotally-mounted disk-holder, substantially as described.

12. In a disk-sharpener, a supporting-arm, a holder-bar, means connecting the holder-bar to the said arm for adjustment of the former on the latter, a disk-holder pivotally mounted on the holder-bar, and a yielding connection between the disk-holder and the holder-bar to adjust the former and permit independent movement thereof, for the purpose set forth.

In testimony whereof I have hereunto set my hand in presence of two subscribing witnesses.

ROYAL M. HAMMOND.

Witnesses:
PETER GREISSER,
W. B. GAUMER.